US012249214B2

(12) United States Patent
Hsu et al.

(10) Patent No.: US 12,249,214 B2
(45) Date of Patent: Mar. 11, 2025

(54) GAMBLING GAME SYSTEM AND METHOD FOR PROVIDING VARIABLE ODDS

(71) Applicant: JUMBO TECHNOLOGY CO., LTD., Taichung (TW)

(72) Inventors: Shun-Tsung Hsu, Taichung (TW); Chang-Yi Wang, Taichung (TW)

(73) Assignee: JUMBO TECHNOLOGY CO., LTD., Taichung (TW)

( * ) Notice: Subject to any disclaimer, the term of this patent is extended or adjusted under 35 U.S.C. 154(b) by 315 days.

(21) Appl. No.: 17/915,980

(22) PCT Filed: Apr. 1, 2020

(86) PCT No.: PCT/CN2020/082704

§ 371 (c)(1),
(2) Date: Sep. 29, 2022

(87) PCT Pub. No.: WO2021/196069

PCT Pub. Date: Oct. 7, 2021

(65) Prior Publication Data

US 2023/0162568 A1 May 25, 2023

(51) Int. Cl.
*G07F 17/32* (2006.01)

(52) U.S. Cl.
CPC ...... *G07F 17/3244* (2013.01); *G07F 17/3209* (2013.01); *G07F 17/323* (2013.01)

(58) Field of Classification Search
None
See application file for complete search history.

(56) References Cited

U.S. PATENT DOCUMENTS

| | | | | |
|---|---|---|---|---|
| 9,646,459 | B2 | 5/2017 | Hsu | |
| 10,755,521 | B1 * | 8/2020 | Hamman | G07F 17/3227 |
| 2007/0054728 | A1 * | 3/2007 | Hood | G07F 17/32 463/16 |

(Continued)

FOREIGN PATENT DOCUMENTS

| | | | |
|---|---|---|---|
| CN | 102266663 | A | 12/2011 |
| CN | 103889521 | A | 6/2014 |

(Continued)

*Primary Examiner* — Jason T Yen
(74) *Attorney, Agent, or Firm* — Muncy, Geissler, Olds & Lowe, P.C.

(57) ABSTRACT

According to the present invention, at least one variable odds set is respectively generated by an odds processing unit for at least one payout odds of a game result, and the at least one variable odds set respectively has at least one variable odds; there totals more than two variable odds, and the at least one variable odds respectively has a selected probability to replace the corresponding payout odds alternatively; moreover, an odds value of a part of all variable odds is lower than that of the corresponding payout odds, and odds values of the other variable odds are to make a change value of a calculated return-to-player percentage satisfy a designated condition, wherein the designated condition may be that the change value of the return-to-player percentage is the minimum. According to the present invention, the numerical value of a part of the variable odds is reduced, so that the numerical values of other variable odds are improved, and thus, the maximum possible numerical value of the variable odds can attract players.

20 Claims, 9 Drawing Sheets

(56) References Cited

U.S. PATENT DOCUMENTS

| | | | | |
|---|---|---|---|---|
| 2009/0121434 A1* | 5/2009 | Baerlocher | ......... | G07F 17/3276<br>463/31 |

FOREIGN PATENT DOCUMENTS

| | | | |
|---|---|---|---|
| CN | 106492450 | A | 3/2017 |
| CN | 108310754 | A | 7/2018 |
| WO | WO-2007140517 | A1 | 12/2007 |

* cited by examiner

GAMBLING GAME SYSTEM AND METHOD FOR PROVIDING VARIABLE ODDS

FIELD OF THE INVENTION

The present invention relates to a game system for providing variable odds and method thereof, and more particularly to a game system and method thereof for generating a numerical value of variable odds that is sufficient to attract players.

BACKGROUND OF THE INVENTION

For example, U.S. Pat. No. 9,646,459 discloses an incentive apparatus for gambling game systems, which is used to increase the odds of gambling game systems. The incentive apparatus for gambling game systems mainly uses a component for calculating variable odds of additional stakes, that randomly selects a fixed quantity from a plurality of game results and generates a variable odds of additional stakes for each of the game results, and then immediately displays the variable odds of additional stakes on an electronic display panel correspondingly, and for bets that have bet on the corresponding game results, a payout component pays the players based on a payout odds and by preferentially selecting the variable odds of additional stakes. Accordingly, the incentive apparatus for gambling game systems increase a rate of Return to Player (RTP), so that the players expect to obtain additional incentives from the gambling game system, and attractiveness of the gambling game system is enhanced, thereby increasing the utilization rate of the gambling game system.

However, the above method of enhancing the attractiveness of the gambling game system by increasing the rate of RTP directly sacrifices the operating profit of the game dealer. For the game dealer, although excessively a high rate of RTP can increase turnover, it is unfavorable to operating profit. When limiting the rate of RTP to meet the expected operating profit value of the game dealer, for the players, a maximum numerical value of the variable odds of additional stakes is still too small to produce an effect of attracting players.

SUMMARY OF THE INVENTION

A main object of the present invention is to disclose a game system and method thereof for providing variable odds, which generates a value of variable odds sufficient to attract players under the premise of minimum change in the rate of Return to Player (RTP).

In order to achieve the above object, the present invention is a game system. In one embodiment, the game system is provided for a player to play at least one round of a gambling game. The gambling game includes a plurality of game results and a payout odds set, the payout odds set includes a plurality of payout odds corresponding to the plurality of game results. In each round of the gambling game, each of the plurality of game results includes a probability of occurrence, and a rate of Return to Player (RTP) of the gambling game is calculated according to the probability of occurrence. The game system includes a display unit, an input unit, an odds processing unit, a game result generating unit, a payout unit and a game processing unit. Wherein the display unit is used to display a game screen of the gambling game, and the game screen includes a plurality of betting areas corresponding to the plurality of game results. The input unit is provided for the player to bet on the plurality of betting areas to generate a bet signal.

The odds processing unit respectively generates at least one variable odds set corresponding to at least one of the plurality of payout odds, each of the at least one variable odds set includes at least one variable odds for selecting and replacing the corresponding payout odds, and each of the at least one variable odds has a probability to be selected. In each of the variable odds sets, according to the probability to be selected, the odds processing unit selects one of the at least one variable odds to replace the payout odds correspondingly to generate an adjusted payout odds set for the gambling game. The display unit displays the adjusted payout odds set in the betting area correspondingly, and wherein the at least one variable odds set meets a plurality of requirements that numbers of all the variable odds are more than two, and numerical values of parts of all the variable odds are lower than numerical values of the corresponding payout odds and numerical values of the others of the variable odds are calculated according to a variable value of the rate of RTP which is made to meet a specified condition.

In addition, the game result generating unit selects one of the plurality of game results according to the probability of occurrence in each round of the gambling game as a round result thereof. The payout unit pays out according to the bet signal, the round result and the adjusted payout odds set. The game processing unit is connected to the display unit, the input unit, the odds processing unit, the game result generating unit and the payout unit, and the game processing unit operates the display unit, the input unit, the odds processing unit, the game result generating unit and the payout unit to allow the gambling game to perform the at least one round of the gambling game.

In another embodiment, the odds processing unit also provide a plurality of odds tables for the player selecting and enabling one of the plurality of odds tables. Each of the plurality of odds tables includes a variable odds set corresponding to the payout odds, each of the variable odds sets includes a plurality of variable odds for selecting and replacing the corresponding payout odds, and each of the variable odds has a probability to be selected. In each of the variable odds sets of the enabled odds table, according to the probability to be selected, the odds processing unit selects one of the plurality of variable odds to replace the payout odds correspondingly to generate an adjusted payout odds set, wherein the display unit displays the adjusted payout odds set in the betting area correspondingly. Each of the plurality of odds tables separately meets a plurality of requirements that numerical values of parts of the variable odds in each of the variable odds sets of each of the odds tables are lower than numerical values of the corresponding payout odds, and numerical values of the others of the variable odds are calculated according to a variable value of the rate of RTP which is made to meet a specified condition.

In another embodiment, the odds processing unit also groups the plurality of payout odds into at least one set according to numerical values thereof, and selects the at least one set to provide a variable odds sets correspondingly for the player selecting and enabling one of the corresponding variable odds sets, each of the variable odds sets includes a variable odd for selecting and replacing the corresponding payout odds, and each of the variable odds has a probability to be selected. After the selected variable odds set is enabled, the odds processing unit according to the probability to be selected selects one of the variable odds to replace the at least one payout odds of a same set correspondingly to generate an adjusted payout odds set for the gambling game, wherein the display unit displays the adjusted payout odds set in the betting area correspondingly, and wherein each of the variable odds sets separately meets a plurality of requirements that numerical values of parts of the variable odds of each of the variable odds sets are lower than the corresponding payout odds, and numerical values of the others of the variable odds are calculated according to a variable value of the rate of RTP which is made to meet a specified condition.

In addition, the present invention also provides a method. In one embodiment, the method provides a player to play at least one round of a gambling game. The gambling game includes a plurality of game results and a payout odds set, and a display unit displays a game screen of the gambling game, and the game screen includes a plurality of betting areas corresponding to the plurality of game results. The payout odds set includes a plurality of payout odds corresponding to the plurality of game results, and in each of the rounds of game, each of the plurality of game results includes a probability of occurrence, and a rate of Return to Player (RTP) of the gambling game is calculated according to the probability of occurrence. The method of the gambling game includes a betting step, a variable odds selecting step, an odds updating step, a game result generating step and a payout step.

The betting step generating a bet signal via an input unit through the player betting on the betting areas;

- the variable odds selecting step generating at least one variable odds set corresponding to at least one of the plurality of payout odds respectively by an odds processing unit, wherein the at least one variable odds set respectively includes at least one variable odds respectively for selecting and replacing the corresponding payout odds, and each of the at least one variable odds has a probability to be selected, and wherein in each of the variable odds sets, according to the probability to be selected, the odds processing unit selects one of the at least one variable odds to replace the payout odds correspondingly to generate an adjusted payout odds set for the gambling game, and wherein the at least one variable odds set meets a plurality of requirements that numbers of all the variable odds are more than two, and numerical values of parts of all the variable odds are lower than numerical values of the corresponding payout odds and numerical values of the others of the variable odds are calculated according to a variable value of the rate of RTP which is made to meet a specified condition;
- the odds updating step displaying the adjusted payout odds set on the display unit after completing the betting step and the variable odds selecting step;
- the game result generating step selecting one of the plurality of game results according to the probability of occurrence by a game result generating unit in each round of the gambling game as a round result for each round of the gambling game; and
- the payout step paying out according to the bet signal, the round result, and the adjusted payout odds set by a payout unit.

In another embodiment, method of the gambling game method includes an odds selecting step, a betting step, a variable odds selecting step, an odds updating step, a game result generating step, and a payout step.

In the odds selecting step, providing a plurality of odds tables from an odds processing unit for the player selecting and enabling one of the plurality of odds tables, each of the plurality of odds tables including the variable odds set corresponding to the payout odds, each of the variable odds sets includes a plurality of variable odds for selecting and replaces the corresponding payout odds, and each of the variable odds has a probability to be selected, and wherein each of the plurality of odds tables separately meeting a plurality of requirements that numerical values of parts of the variable odds in each of the variable odds sets of each of the odds tables are lower than numerical values of the corresponding payout odds, and numerical values of the others of the variable odds are calculated according to a variable value of the rate of RTP which is made to meet a specified condition.

In the variable odds selecting step, selecting one of the variable odds in each of the variable odds sets of the enabled odds table according to the probability to be selected through the odds processing unit and replacing the corresponding payout odds to generate an adjusted payout odds set for the gambling game.

In another embodiment, method of the gambling game method includes an odds selecting step, a betting step, a variable odds selecting step, an odds updating step, a game result generating step, and a payout step.

In the odds selecting step, grouping the plurality of payout odds into at least one set according to numerical values thereof, and selecting the at least one set to provide a variable odds sets correspondingly for the player selecting and enabling one of the corresponding variable odds sets by the odds processing unit, wherein each of the variable odds sets including a variable odd for selecting and replacing the corresponding payout odds, and each of the variable odds having a probability to be selected, and wherein each of the variable odds sets separately meets a plurality of requirements that numerical values of parts of the variable odds of each of the variable odds sets are lower than the corresponding payout odds, and numerical values of the others of the variable odds are calculated according to a variable value of the rate of RTP which is made to meet a specified condition.

In the variable odds selecting step, selecting one of the variable odds according to the probability to be selected through the odds processing unit, after enabling the selected variable odds set, and replacing the at least one payout odds of a same set respectively to generate an adjusted payout odds set for the gambling game.

Accordingly, the present invention is the game system for providing variable odds and method thereof, which increases the numerical value of parts of the variable odds by reducing the others of the variable odds. Therefore, the present invention generates a numerical value of the variable odds sufficient to attract the player under the premise of minimum change in the rate of Return to Player (RTP), and at the same time, to meet the demand for attracting the player and to maintain the operating profit.

DETAILED DESCRIPTION OF THE PREFERRED EMBODIMENTS

The detailed description and technical contents of the present invention are described below with reference to the drawings.

Figure 1:
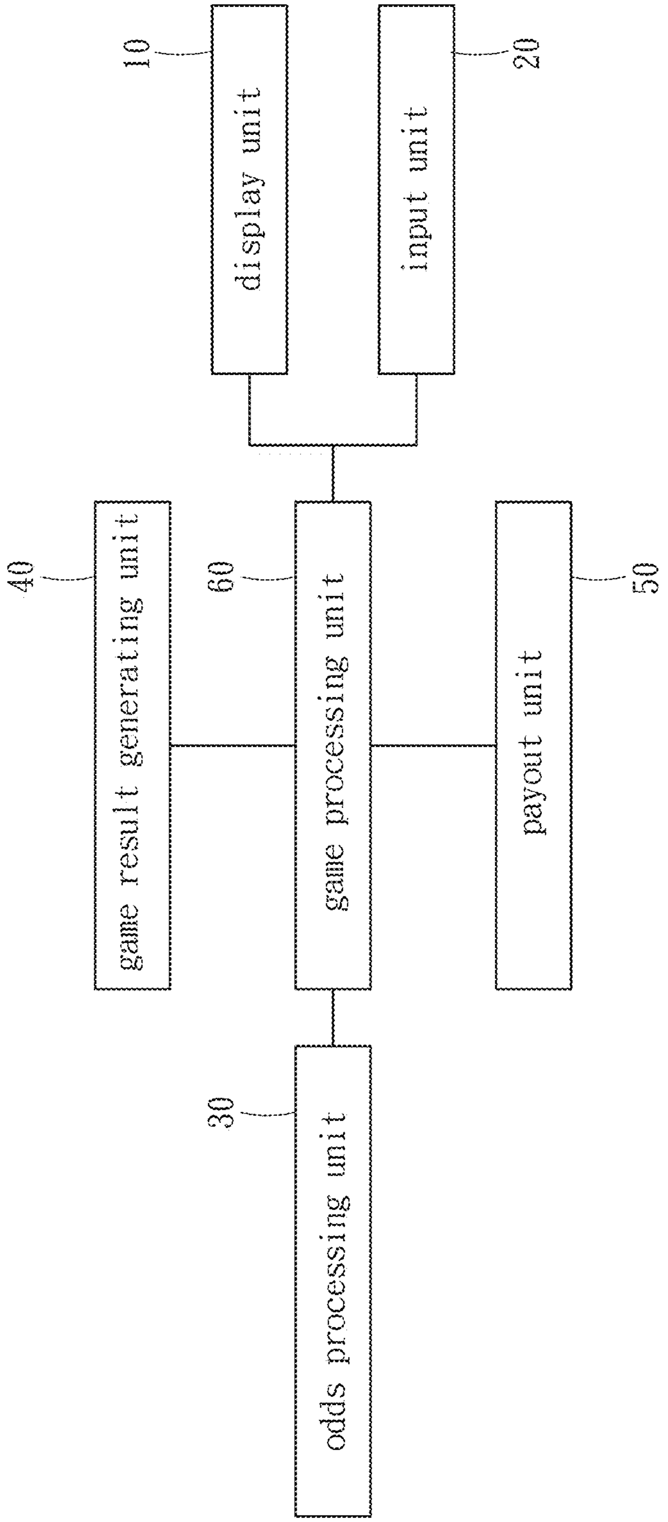
FIG. 1 is a system architecture diagram of the present invention.
Figure 2:
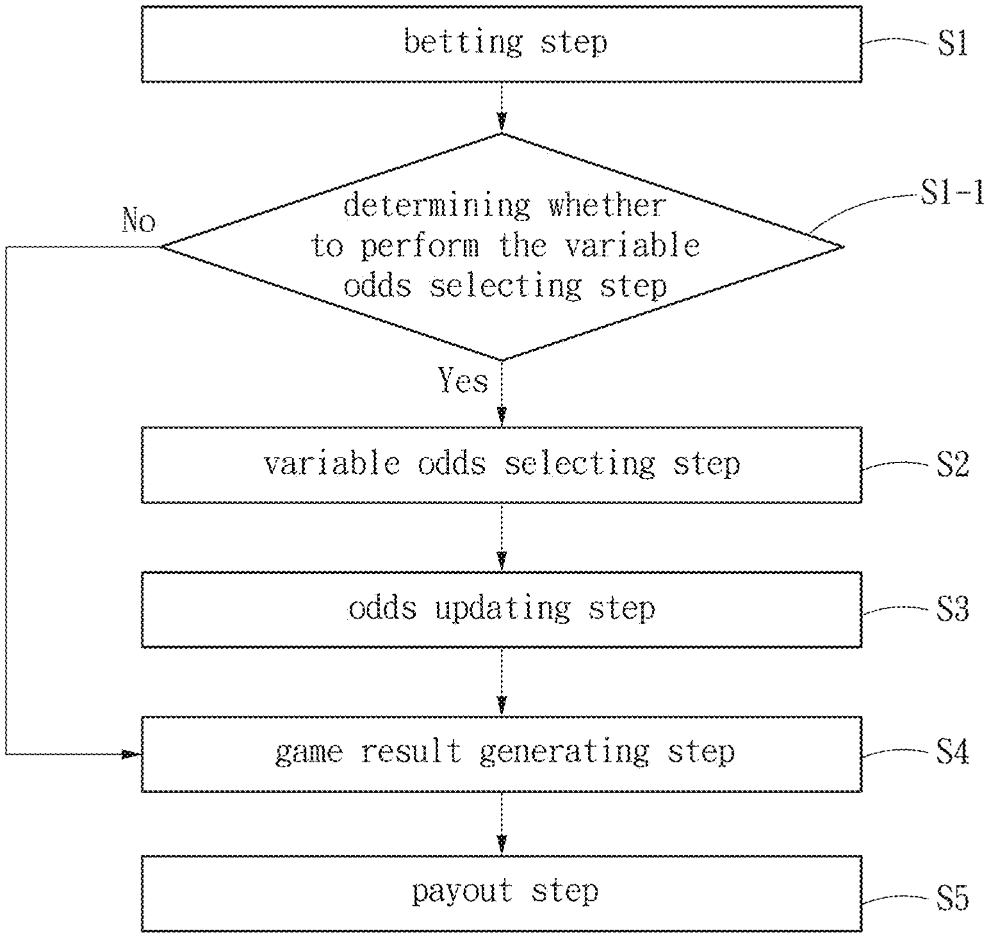
FIG. 2 is a flowchart of steps of a first embodiment of the present invention.
Figure 3A:
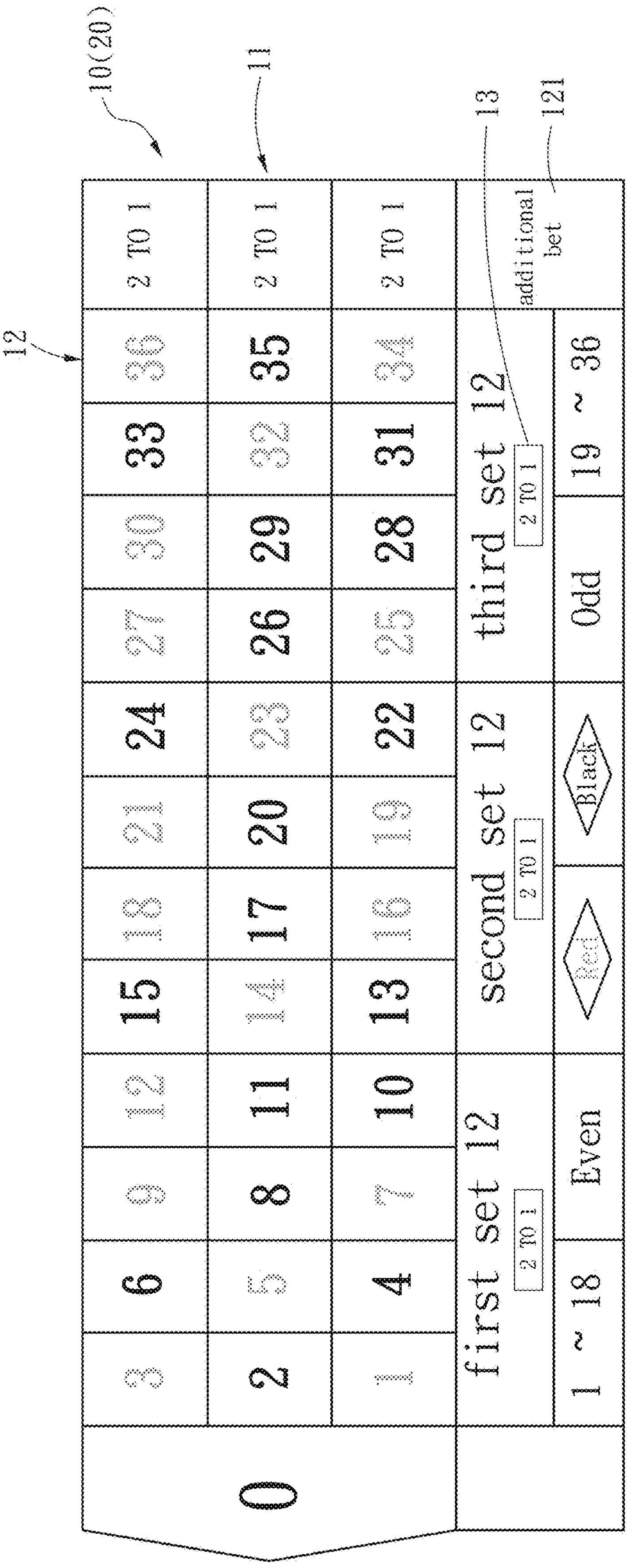
FIGS. 3A and 3B are schematic diagrams of a betting table of the first embodiment of the present invention.

Please refer to FIG. 1, FIG. 2, FIG. 3A and FIG. 3B for a game system for providing variable odds of a first embodiment of the present invention. The game system is provided for a player to play at least one round of a gambling game. The gambling game includes a plurality of game results and a payout odds set. The payout odds set includes a plurality of payout odds 13 corresponding to the plurality of game results. The gambling game includes roulette game, SicBo (dices) game, baccarat game, etc. In the first embodiment, it takes a roulette game as an example for explanation. The payout odds set is shown in the following table (only listed some as representatives). The first column lists the plurality of game results, and the second column lists the plurality of payout odds 13. The plurality of payout odds 13 is shown in FIG. 3A (only indicated parts) and the payout odds 13 is the most widely used basic odds for roulette games.

| Game results | | Payout odds |
|---|---|---|
| Numerals | 1~36 | 35 |
| Sets | 1~12 (First set)<br>13~24 (Second set)<br>25~36 (Third set) | 2 |
| Odd | 1, 3 . . . 35 | 1 |
| Even | 2, 4 . . . 36 | |

In addition, in each of the rounds of the gambling game, each of the plurality of game results includes a probability of occurrence respectively, and a rate of Return to Player (RTP) of the gambling game is calculated according to the probability of occurrence. RTP is an average value of products of the probability of occurrence of each of the game results and the corresponding payout odds.

As shown in FIG. 1, the game system includes a display unit 10, an input unit 20, an odds processing unit 30, a game result generating unit 40, a payout unit 50, and a game processing unit 60. The game processing unit 60 is connected to the display unit 10, the input unit 20, the odds processing unit 30, the game result generating unit 40 and the payout unit 50, and the game processing unit 60 controls operation of the display unit 10, the input unit 20, the odds processing unit 30, the game result generating unit 40 and the payout unit 50 to allow the gambling game to perform the at least one round of the gambling game.

Please refer to FIG. 3A. The display unit 10 is provided to display a game screen 11 of the gambling game. The game screen 11 includes a plurality of betting areas 12 corresponding to the plurality of game results. In an embodiment, the input unit 20 is integrated with the display unit 10, and the input unit 20 is a touch display screen that provides both input and display functions for the player to bet on the betting areas 12 to generate a bet signal.

Figure 3B:
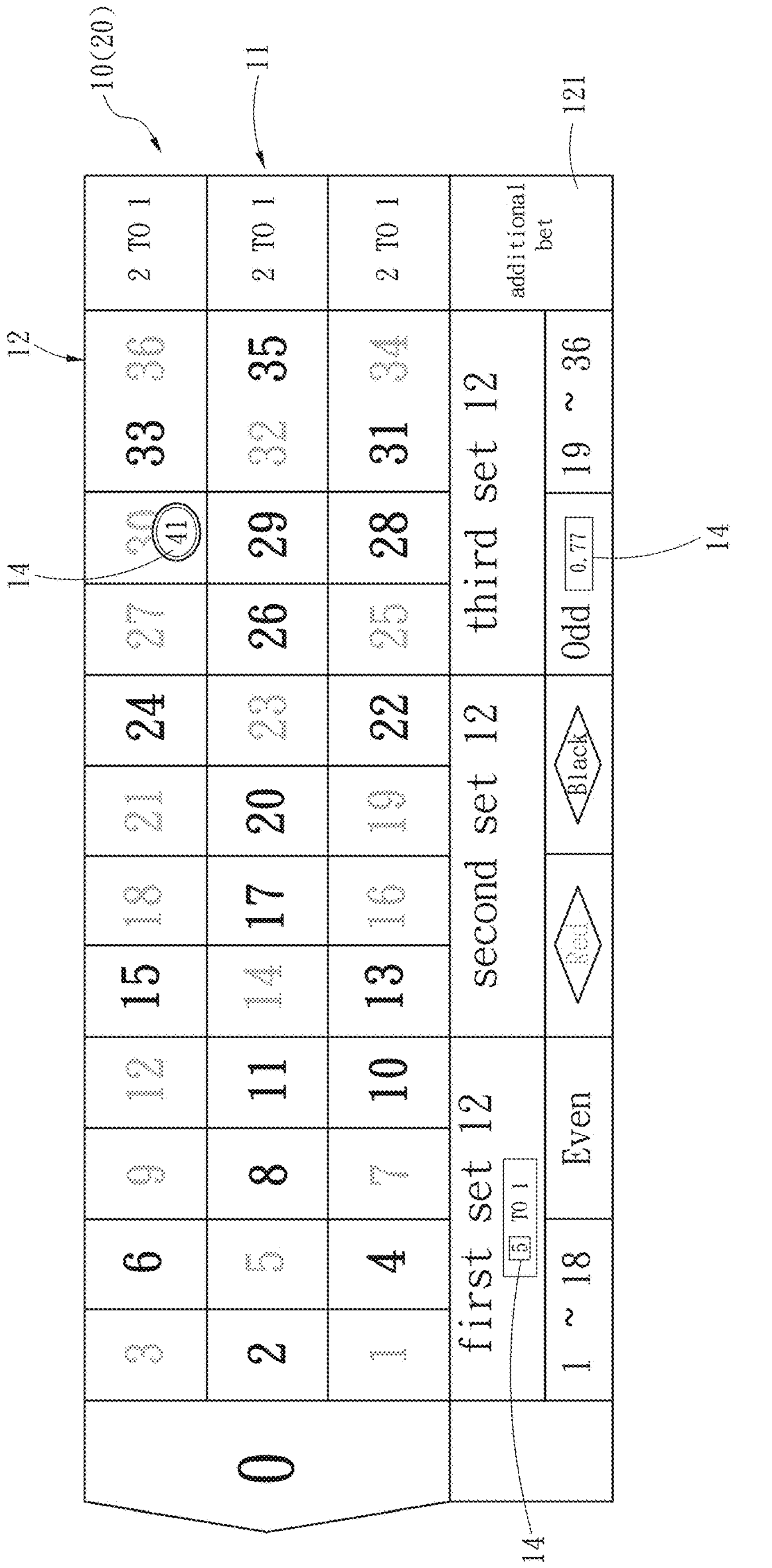

Please refer to FIG. 3A and FIG. 3B. The odds processing unit 30 generates at least one variable odds set corresponding to at least one of the plurality of payout odds 13 (as shown in FIG. 3A), respectively. The at least one variable odds set each has at least one variable odds 14 for selecting and replacing the corresponding payout odds 13, and each of the variable odds 14 has a probability to be selected.

As shown in the following table, it is one embodiment of the at least one variable odds set. The columns respectively represent the corresponding payout odds 13 of the embodiment of the game results, the corresponding variable odds set (including the at least one variable odds 14) and the selected probabilities corresponding to each of the variable odds 14.

| Game results | | Payout odds | Variable odds sets | Selected probabilities |
|---|---|---|---|---|
| Numeral | 30 | 35 | (27, 41, 101, 168) | (83%, 10%, 5%, 2%) |
| First set | 1~12 | 2 | (1, 5) | (75%, 25%) |
| Odd | 1, 3 . . . 35 | 1 | (0.77, 3) | (90%, 10%) |

In addition, the at least one variable odds set meets the following conditions: the number of the variable odds 14 in all variable odds set are more than two; in one variable odds set, the numerical values of parts of the variable odds 14 are lower than the numerical values of the corresponding payout odds 13; and the numerical values of the others of the variable odds 14 are calculated according to a variable value of the rate of RTP which is made to meet a specified condition. The specified condition is selected according to actual needs. Preferably, the specified condition is that the variable value of the rate of RTP is a minimum. The variable value is a difference between numerical values of the rate of RTP before and after changing and then takes the absolute value. That is, the less a variation (including increase and decrease) of the rate of RTP the better. Ideally, in order to maintain the operating profit, the variable value of the rate of RTP being zero is the most ideal state. However, in actual calculations, there is a problem of being impossible to be divided with no remainder, so in practice, as long as keeping the variable value of the rate of RTP as minimum will be the most ideal state. In other embodiments, the specified condition is that the rate of RTP increases or decreases by a specified value to meet business requirements.

It should be noted that the rate of RTP of the game is obtained by first calculating the rate of RTP of each variable odds sets separately and then averaging all the rate of RTP thereof. Therefore, under the premise that the variable value of the rate of RTP is minimal, as long as the numerical value of part (at least one but not including all) of the variable odds 14 is lower than the numerical value of the corresponding payout odds 13, numerical values of the others of variable odds 14 is effectively increased to attract the player to play the gambling game. In addition, the numerical values of the variable odds 14 provided in the embodiments of the present invention are only indicative values, but not actual numerical values of odds, which can be implemented by those skilled in the art based on the techniques disclosed in the present invention according to actual requirements.

After generating the at least one variable odds set, in each of the variable odds sets, the odds processing unit 30 selects one of the at least one variable odds 14 according to the probability to be selected to replace the corresponding payout odds 13 to allow the gambling game to generate an adjusted payout odds set. One embodiment of the adjusted payout odds set is shown in the table below.

| Game results | | Original payout odds | Adjusted payout odds |
|---|---|---|---|
| Numeral | 30 | 35 | 41 |
| First set | 1~12 | 2 | 5 |
| Odd | 1, 3 . . . 35 | 1 | 0.77 |

The display unit 10 displays the adjusted payout odds set in the betting areas 12 (as shown in FIG. 3B).

Finally, the game result generating unit 40 selects one of the game results according to the probability of occurrence in each of the rounds of the gambling game as a round result thereof. The payout unit 50 pays out according to the bet signal, the round result and the adjusted payout odds set.

In addition, in order to meet the demands of the player, the input unit 20 allows the player to selectively input at least one of the upper limit value, the lower limit value, or the amount of the at least one variable odds 14, and then allows the odds processing unit 30 to generate the at least one variable odds set accordingly. For example, the player selectively inputs an upper limit value, a lower limit value, or amount of the variable odds 14 the can be accepted according to preference, and the odds processing unit 30 will generate the at least one variable odds set based on the player's input. Therefore, the player can obtain the different variable odds 14 in each of the rounds of the gambling game to maintain excitements.

In practice, the odds processing unit 30 generates the at least one variable odds set by a mathematical trial and error method. In detail, the odds processing unit 30 first randomly generates the variable odds 14 of the at least one variable odds set, including the amount, the numerical value, and the probability to be selected, under the premise of meeting the player's input conditions. Then the odds processing unit 30 calculates the rate of RTP to determine whether the variable value of the rate of RTP is positive or negative. When the variable value of the rate of RTP is positive (negative), it represents that the numerical value of the variable odds 14 is too high (too low), and the odds processing unit 30 will decrease (increase) the numerical value by adjusting with minimum unit and recalculate the rate of RTP until the variable value of the rate of RTP is changed to a negative number (positive number). After the variable value of the rate of RTP converges, the odds processing unit 30 selects a minimal absolute value of the variable value of the rate of RTP as the last variable odds set to meet the specified condition.

In addition, the game processing unit 60 further determines whether to allow the odds processing unit 30 to generate the at least one variable odds set according to a preset condition. In detail, the preset condition is set by the player or operator, or is used as a bonus in the gambling game, or only when a bet amount of the player exceeds a specified numerical value, the odds processing unit 30 generates the at least one variable odds set. Alternatively, an additional betting option 121 is provided in the betting area 12, and only when the player bets on the additional betting option 121, the odds processing unit 30 generates the at least one variable odds set.

FIG. 2 is a flowchart of steps of a method corresponding to a first embodiment. The steps of the method of the gambling game include: step S1: a betting step, step S2: a variable odds selecting step, step S3: an odds updating step, step S4: a game result generating step, and step S5: a payout step.

Step S1: the betting step, generating the bet signal by the input unit 20 through the player betting on the betting areas 12. A step S1-1 is alternatively performed thereafter. Step S1-1: determining whether to perform the variable odds selecting step. Namely, the game processing unit 60 determines whether to allow the odds processing unit 30 to generate the at least one variable odds sets, that is determining whether to perform the variable odds selecting step S2. If determining to select the variable odds 14, continuing the variable odds selecting step S2; and if determining not to select the variable odds 14, proceeding directly to the game result generating step S4.

Step S2: the variable odds selecting step, generating at least one variable odds set by the odds processing unit 30, and then selecting one of the at least one variable odds 14 according to a probability to be selected to replace the corresponding payout odds 13 to allow to generate the adjusted payout odds set for the gambling game.

Step S3: the odds updating step, displaying the adjusted payout odds set on the display unit 10 after completing the betting step S1 and the variable odds selecting step S2, as shown in FIG. 3B.

Step S4: the game result generating step, generating the round result by the game result generating unit 40.

Step S5: the payout step, paying out by the payout unit 50 according to the bet signal, the round result, and the adjusted payout odds set.

Figure 4:
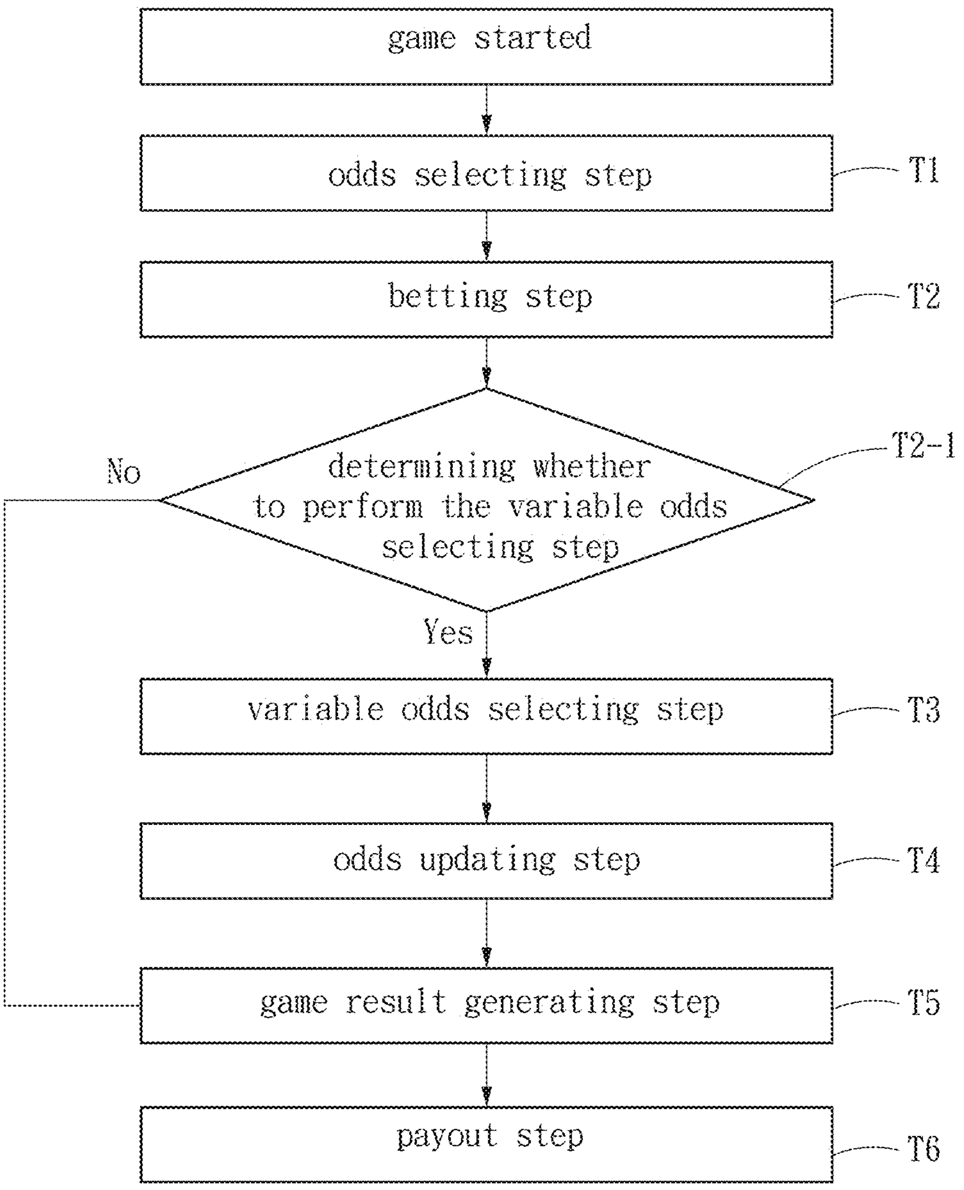
FIG. 4 is a flowchart of steps of a second embodiment of the present invention.
Figure 5A:
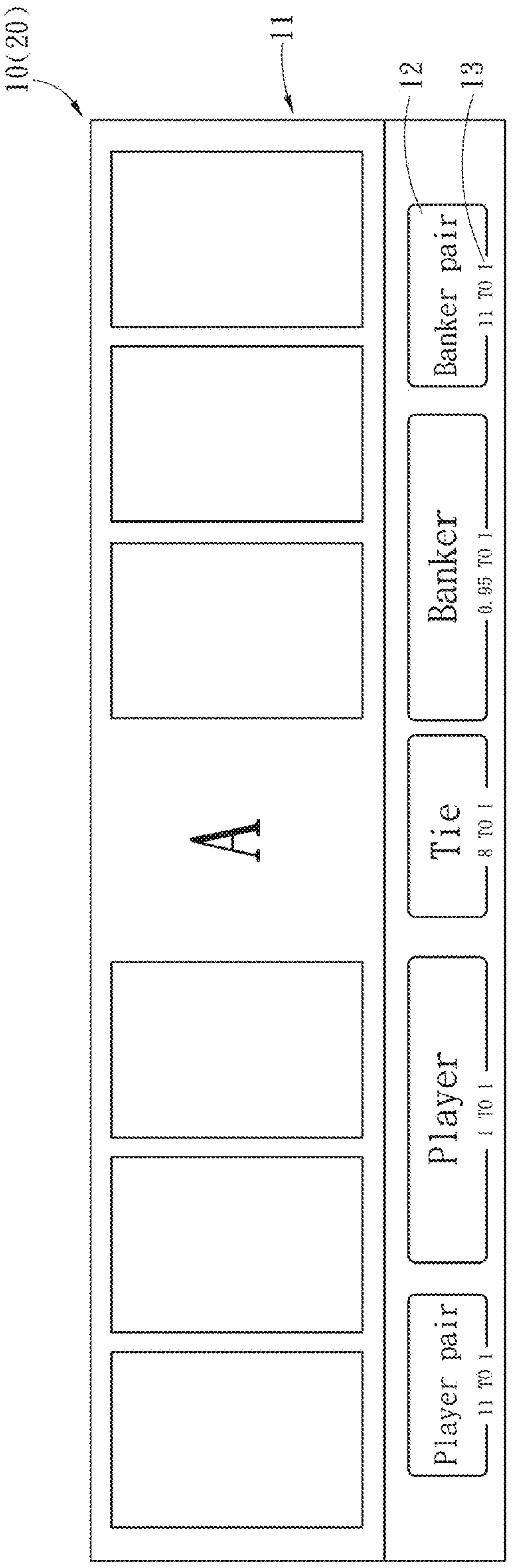
FIGS. 5A and 5B are schematic diagrams of a betting table of the second embodiment of the present invention.

For a second embodiment of the present invention, please refer to FIG. 1, FIG. 4, FIG. 5A and FIG. 5B. The second embodiment takes the baccarat game as an example for explanation, which has different procedure steps from the first embodiment. The corresponding payout odds set thereof is shown in the following table. The first column lists the game results, and the second column lists the plurality of payout odds 13. The plurality of payout odds 13 is shown in FIG. 5A.

| Game results | Payout odds |
|---|---|
| Banker | 0.95 |
| Player | 1 |
| Tie | 8 |
| Banker pair | 11 |
| Player pair | 11 |

Compared with the first embodiment, the odds processing unit 30 of the second embodiment provides a plurality of odds tables.

An embodiment of the odds tables is shown below:

| Tables | Game results | Payout odds | Variable Odds sets (Variable Odds) | Selected Probabilities |
|---|---|---|---|---|
| Table 1 | Banker | 0.95 | (0.83, 2) | (90%, 10%) |
| | Player | 1 | (0.88, 2) | (90%, 10%) |
| | Tie | 8 | (7, 8, 10) | (50%, 30%, 20%) |
| | Banker pair | 11 | (10, 11, 14) | (50%, 35%, 15%) |
| | Player pair | 11 | (10, 11, 14) | (50%, 35%, 15%) |
| Table 2 | Banker | 0.95 | (0.85, 2) | (92%, 8%) |
| | Player | 1 | (0.9, 2) | (92%, 8%) |
| | Tie | 8 | (6, 9, 12) | (50%, 35%, 15%) |
| | Banker pair | 11 | (9, 12, 15) | (50%, 35%, 15%) |
| | Player pair | 11 | (9, 12, 15) | (50%, 35%, 15%) |
| Table 3 | Banker | 0.95 | (0.8, 3) | (94%, 6%) |
| | Player | 1 | (0.85, 3) | (94%, 6%) |
| | Tie | 8 | (6, 8, 20) | (60%, 30%, 10%) |
| | Banker pair | 11 | (8, 10, 30) | (60%, 30%, 10%) |
| | Player pair | 11 | (8, 10, 30) | (60%, 30%, 10%) |

The player selects and enables one of the odds tables, that is, chooses any one from Table 1, Table 2 and Table 3. The odds tables respectively record the variable odds sets corresponding to the payout odds 13.

In addition, each of the odds tables separately meets the following conditions: in each of the odds tables, the numerical values of parts of the variable odds 14 of each variable odds sets are lower than the numerical values of the corresponding payout odds 13; and the numerical values of the others of variable odds 14 are calculated according to a variable value of the rate of RTP which is made to meet a specified condition. Herein, mode of the specified condition can be the same as that of the first embodiment, and will not be described repeatedly.

The plurality of variable odds sets respectively includes the at least one variable odds 14 for selection to replace the corresponding payout odds 13. The at least one variable odds 14 each has a probability to be selected. In addition, the odds processing unit 30 further provides a basic odds table, the basic odds table records the payout odds 13, and the basic odds table is included for the player choosing to enable. That is, the player could select the payout odds 13 to play the gambling game.

In each of the variable odds sets of the enabled odds table, the odds processing unit 30 selects one of the variable odds 14 according to the probability to be selected to replace the corresponding payout odds 13 to allow the gambling game to generate an adjusted payout odds set. For example, if Table 1 is selected, one embodiment of the adjusted payout odds set is shown in the following table.

| Game results | Original payout odds | Adjusted payout odds |
|---|---|---|
| Banker | 0.95 | 0.83 |
| Player | 1 | 2 |
| Tie | 8 | 7 |
| Banker pair | 11 | 10 |
| Player pair | 11 | 14 |

Figure 5B:
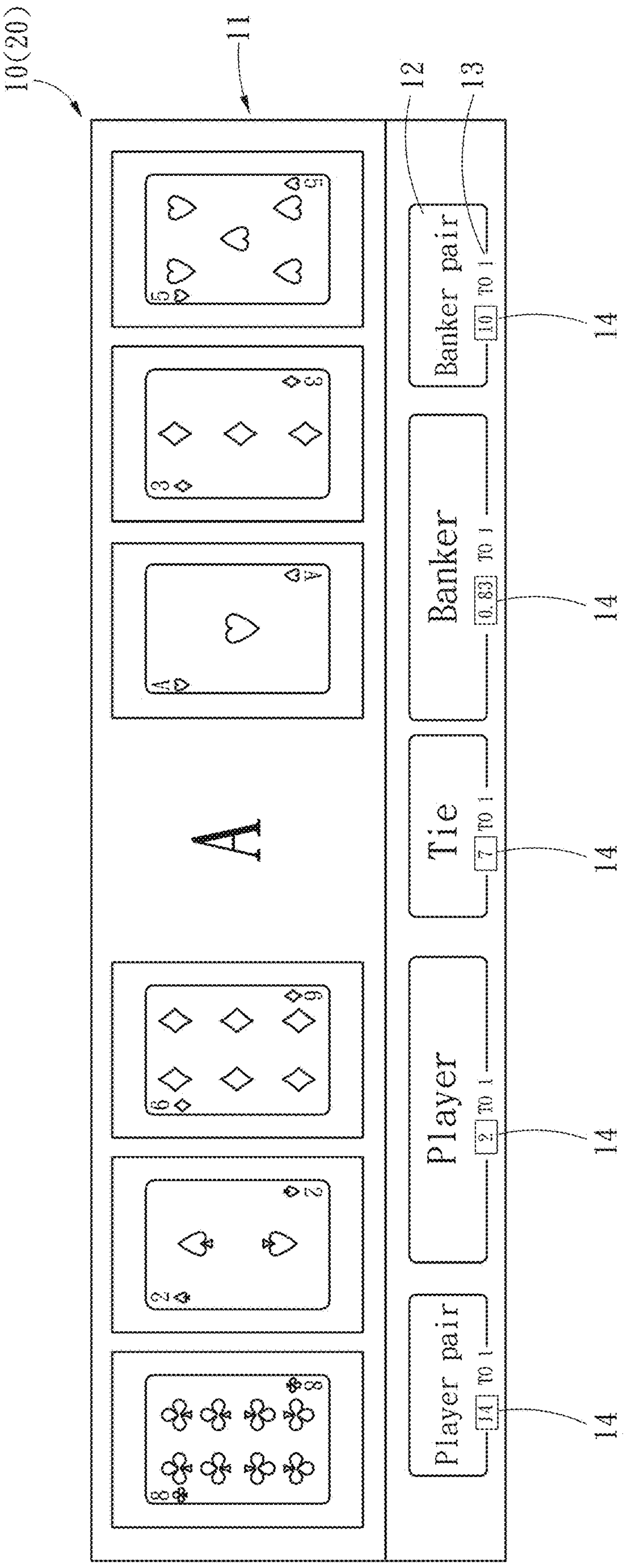

The display unit 10 displays the adjusted payout odds set in the betting area 12 (as shown in FIG. 5B).

FIG. 4 is a flowchart corresponding to a method of the gambling game of the second embodiment. The steps of the method of the gambling game include: step T1: an odds selecting step, step T2: a betting step, step T3: a variable odds selecting step, step T4: an odds updating step, step T5: a game result generating step, and step T6: a payout step.

Compared with the first embodiment, firstly performs step T1: the odds selecting step, providing the plurality of odds tables via the odds processing unit 30 for the player selecting and enabling any one of the plurality of odds tables. Besides, the basic odds table is included in a range for the player choosing to enable.

Step T2: the betting step, generating the bet signal by the input unit 20 through the player betting on the betting areas 12. A step T2-1 is alternatively performed after step T2. Step T2-1: determining whether to perform the variable odds selecting step. If determining to select the variable odds 14, continuing step T3: the variable odds selecting step; and if determining not to select the variable odds 14, proceeding directly to step T5: the game result generating step.

Step T3: the variable odds selecting step, selecting one of the at least one variable odds 14 according to a probability to be selected through the odds processing unit 30 to replace the corresponding payout odds 13 to allow to generate the adjusted payout odds set for the gambling game.

Step T4: the odds updating step, displaying the adjusted payout odds set in the betting area 12 on the display unit 10 after completing the betting step T2 and the variable odds selecting step T3, as shown in FIG. 5B.

Step T5: the game result generating step, generating the round result by the game result generating unit 40.

Finally, step T6: the payout step, paying out by the payout unit 50 according to the bet signal, the round result, and the adjusted payout odds set.

Figure 6A:
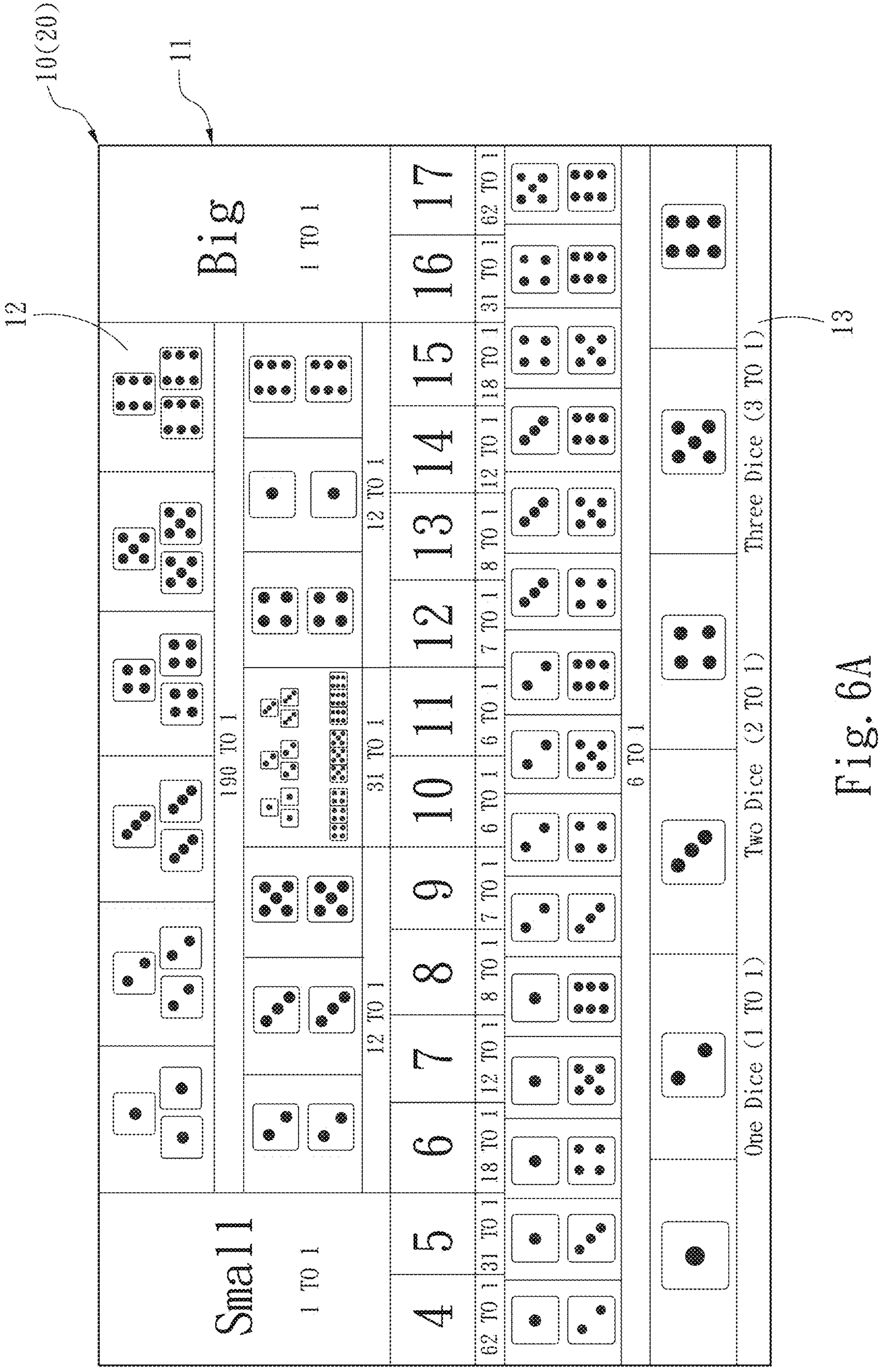
FIGS. 6A and 6B are schematic diagrams of a betting table of a third embodiment of the present invention.

For a third embodiment of the present invention, please refer to FIG. 1, FIG. 4, FIG. 6A and FIG. 6B. The third embodiment takes the SicBo game as an example for explanation. The corresponding payout odds set is shown in the following table (only listed some as representatives). The first column lists the game results, and the second column lists the payout odds 13. The payout odds 13 is shown in FIG. 6A.

| Game results | Payout odds |
|---|---|
| Big | 1 |
| Small | 1 |
| One Dice | 1 |
| Two Dice | 2 |
| Three Dice | 3 |
| Triple | 190 |

Compared with the second embodiment, the odds processing unit 30 of the third embodiment groups the payout odds 13 according to the numerical values, that is the game results with a same numerical value are regarded as a same set. The odds processing unit 30 selects at least one set to provide for the corresponding variable odds sets respectively. The player selects and enables one of the corresponding variable odds sets for each set of the payout odds 13. The variable odds sets respectively includes the plurality of variable odds 14 for selection to replace the corresponding payout odds 13, and the plurality of variable odds 14 each has a probability to be selected.

One embodiment of grouping by the numerical values is shown below:

| Game results (grouped by sets) | Payout odds | Variable odds sets | Selected Probabilities |
|---|---|---|---|
| Big or Small | 1 | (0.8, 3) | (91%, 9%) |
| Any Triple | 31 | (25, 70) | (87%, 13%) |
| Triple | 190 | (150, 300) | (74%, 26%) |

After the selected variable odds set is enabled, the odds processing unit 30 selects one of the variable odds 14 according to the probability to be selected to replace the at least one payout odds 13 of the same set to allow the gambling game to generate an adjusted payout odds set.

One embodiment of the adjusted payout odds set is shown in the table below:

| Game results (grouped by sets) | Original payout odds | Adjusted payout odds |
|---|---|---|
| Big or Small | 1 | 0.8 |
| Any Triple | 31 | 70 |
| Triple | 190 | 300 |

Figure 6B:
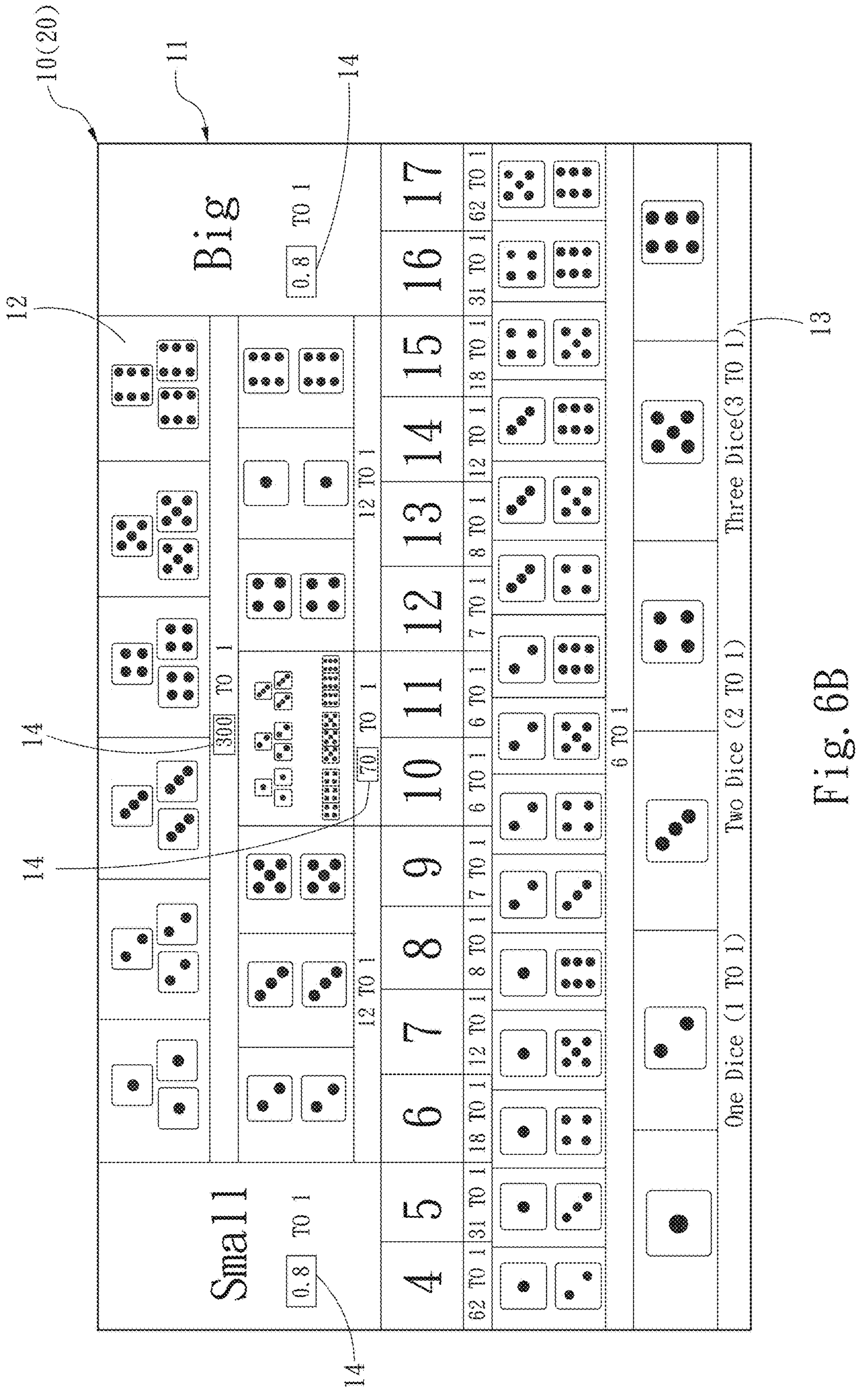

The display unit 10 displays the adjusted payout odds set in the betting area 12 (as shown in FIG. 6B).

In addition, each of the variable odds sets separately meets the following conditions: the numerical values of parts of the variable odds 14 of each variable odds sets are lower than the numerical values of the corresponding payout odds 13; and the numerical values of the others of variable odds 14 are calculated according to a variable value of the rate of RTP which is made to meet a specified condition. Herein, mode of the specified condition can be the same as that of the first embodiment, and will not be described repeatedly.

The flowchart shown in FIG. 4 is also corresponding to the third embodiment.

Steps of the method of the gambling game of the third embodiment include: step T1: an odds selecting step, step T2: a betting step, step T3: a variable odds selecting step, step T4: an odds updating step, step T5: a game result generating step, and step T6: a payout step.

Compared with the second embodiment, step T1: the odds selecting step, grouping the payout odds 13 according to the numerical values and selecting at least one set via the odds processing unit 30 to provide for the corresponding variable odds sets respectively. The player selects and enables any one of the corresponding variable odds sets for each set of the payout odds 13. A quantity of the sets for the player selected is freely determined, and there is no certain limit.

Step T3: the variable odds selecting step, selecting one of the variable odds 14 according to a probability to be selected through the odds processing unit 30 to replace the corresponding payout odds 13 to allow to generate the adjusted payout odds set for the gambling game.

In summary, the advantages of the present invention at least include:

1. The present invention increases the numerical value of parts of the variable odds by reducing the others of the variable odds. Therefore, the present invention generates the numerical value of the variable odds sufficient to attract the player under the premise of minimum change in the rate of Return to Player (RTP), and at the same time, to meet the demand for attracting the player and to maintain the operating profit.
2. The player can select any one of the odds tables. The different odds tables includes the different variable odds sets and the different variable odds, so the player can select to play the gambling game according to own preferences.
3. The odds processing unit groups the payout odds according to the numerical values and selects at least one set to provide for the corresponding variable odds sets respectively. The player can select and enable any one of the provided variable odds sets for at least one of the sets of the payout odds to meet the demand of generating the variable odds for parts of the game results.
4. The specified condition is set according to demands for increasing or decreasing the rate of RTP to provide more flexibility and to meet the requirements of use.
5. The player enters an upper limit value, a lower limit value, or a quantity of the variable odds to meet the personalized customization needs.
6. The game processing unit determines whether to allow the odds processing unit to generate the at least one variable odds set according to a preset condition.

What is claimed is:

1. A game system for providing variable odds, which is provided for a player to play at least one round of a gambling game, the gambling game including a plurality of game results and a payout odds set, the payout odds set including a plurality of payout odds corresponding to the plurality of game results, in each round of the gambling game, each of the plurality of game results including a probability of occurrence, and a rate of Return to Player (RTP) of the gambling game calculated according to the probability of occurrence, the game system including:

a display unit, displaying a game screen of the gambling game, and the game screen including a plurality of betting areas corresponding to the plurality of game results;

an input unit, provided for the player to bet on the plurality of betting areas to generate a bet signal;

an odds processing unit, generating at least one variable odds set corresponding to at least one of the plurality of payout odds, each of the at least one variable odds set including a plurality of variable odds, and each of the plurality of variable odds having a probability to be selected, wherein in each of the at least one variable odds set, according to the probability to be selected, the odds processing unit selects one of the plurality of variable odds to replace the payout odds correspondingly to generate an adjusted payout odds set for the gambling game, wherein the display unit displays the adjusted payout odds set in the betting area correspondingly, and wherein the at least one variable odds set meets a plurality of requirements that numbers of all the variable odds are more than two, and numerical values of parts of the variable odds are lower than numerical values of the corresponding payout odds, and a variable value of the rate of RTP calculated according to the variable odds meets a specified condition;

a game result generating unit, selecting one of the plurality of game results according to the probability of occurrence in each round of the gambling game as a round result thereof;

a payout unit, paying out according to the bet signal, the round result, and the adjusted payout odds set; and a game processing unit, connected to the display unit, the input unit, the odds processing unit, the game result generating unit and the payout unit, and the game processing unit operating the display unit, the input unit, the odds processing unit, the game result generating unit and the payout unit to allow the gambling game to perform the at least one round of the gambling game.

2. The game system for providing variable odds as claimed in claim 1, wherein the specified condition is that the variable value of the rate of RTP is a minimum.

3. The game system for providing variable odds as claimed in claim 1, wherein the input unit allows the player to selectively input an upper limit value, a lower limit value, or amount of the at least one variable odds, and allows the odds processing unit to generate the at least one variable odds set accordingly.

4. The game system for providing variable odds as claimed in claim 3, wherein the odds processing unit generates the at least one variable odds set by a mathematical trial and error method.

5. The game system for providing variable odds as claimed in claim 1, wherein the game processing unit further determines whether the odds processing unit generates the at least one variable odds set according to a preset condition.

6. A game system for providing variable odds, which is provided for a player to play at least one round of a gambling game, the gambling game including a plurality of game results and a payout odds set, the payout odds set including a plurality of payout odds corresponding to the plurality of game results, in each round of the gambling game, each of the plurality of game results including a probability of occurrence, and a rate of Return to Player (RTP) of the gambling game calculated according to the probability of occurrence, the game system including:

a display unit, displaying a game screen of the gambling game, and the game screen including a plurality of betting areas corresponding to the plurality of game results;

an input unit, provided for the player to bet on the plurality of betting areas to generate a bet signal;

an odds processing unit, providing a plurality of odds tables for the player selecting and enabling one of the plurality of odds tables, each of the plurality of odds tables including a plurality of variable odds sets corresponding to the payout odds, each of the variable odds sets including a plurality of variable odds, and each of the variable odds having a probability to be selected, wherein in each of the variable odds sets, according to the probability to be selected, the odds processing unit selects one of the plurality of variable odds to replace the payout odds correspondingly to generate an adjusted payout odds set, wherein the display unit displays the adjusted payout odds set in the betting area correspondingly, and wherein each of the plurality of odds tables separately meeting a plurality of requirements that numerical values of parts of the variable odds in each of the variable odds sets of each of the odds tables are lower than numerical values of the corresponding payout odds, and a variable value of the rate of RTP calculated according to the variable odds meets a specified condition;

a game result generating unit, selecting one of the plurality of game results according to the probability of occurrence in each round of the gambling game as a round result thereof;

a payout unit, paying out according to the bet signal, the round result, and the adjusted payout odds set; and a game processing unit, connected to the display unit, the odds processing unit, the input unit, the game result generating unit and the payout unit, and the game processing unit operating the display unit, the odds processing unit, the input unit, the game result generating unit and the payout unit to allow the gambling game to perform the at least one round of the gambling game.

7. The game system for providing variable odds as claimed in claim 6, wherein the specified condition is that the variable value of the rate of RTP is a minimum.

8. The game system for providing variable odds as claimed in claim 6, wherein the odds processing unit further provides a basic odds table, which lists the payout odds and is included in a range for the player choosing to enable.

9. A game system for providing variable odds, which is provided for a player to play at least one round of a gambling game, the gambling game including a plurality of game results and a payout odds set, the payout odds set including a plurality of payout odds corresponding to the plurality of game results, in each round of the gambling game, each of the plurality of game results including a probability of occurrence, and a rate of Return to Player (RTP) of the gambling game calculated according to the probability of occurrence, the game system including:

a display unit, displaying a game screen of the gambling game, and the game screen including a plurality of betting areas corresponding to the plurality of game results;

an input unit, provided for the player to bet on the plurality of betting areas to generate a bet signal;

an odds processing unit, disposed to group the plurality of payout odds into at least one set according to numerical values thereof, the at least one set includes a plurality of variable odds sets, wherein one of the plurality of variable odds sets is selected and enabled by the player, each of the variable odds sets including a plurality of variable odds, and each of the variable odds having a probability to be selected, wherein after enabling the selected variable odds set, the odds processing unit according to the probability to be selected selects one of the plurality of variable odds to replace the at least one payout odds of a same set correspondingly to generate an adjusted payout odds set, wherein the display unit displays the adjusted payout odds set in the betting area correspondingly, and wherein each of the variable odds sets separately meets a plurality of requirements that numerical values of parts of the variable odds of each of the variable odds sets are lower than the corresponding payout odds, and a variable value of the rate of RTP calculated according to the variable odds meets a specified condition;

a game result generating unit, selecting one of the plurality of game results according to the probability of occurrence in each round of the gambling game as a round result;

a payout unit, paying out according to the bet signal, the round result, and the adjusted payout odds set; and a game processing unit, connected to the display unit, the input unit, the odds processing unit, the game result generating unit and the payout unit, and the game processing unit operating the display unit, the input unit, the odds processing unit, the game result generating unit and the payout unit to allow the gambling game to perform the at least one round of the gambling game.

10. The game system for providing variable odds as claimed in claim 9, wherein the specified condition is that the variable value of the rate of RTP is a minimum.

11. A method for providing variable odds, which is provided for a player to play at least one round of a gambling game, the gambling game including a plurality of game results and a payout odds set, and a display unit displaying a game screen of the gambling game, the game screen including a plurality of betting areas corresponding to the plurality of game results, the payout odds set including a plurality of payout odds corresponding to the plurality of game results, and in each of the rounds of game, each of the plurality of game results including a probability of occurrence, and a rate of Return to Player (RTP) of the gambling game calculated according to the probability of occurrence, the method of the gambling game including:

a betting step, generating a bet signal via an input unit through the player betting on the betting areas;

a variable odds selecting step, generating at least one variable odds set corresponding to at least one of the plurality of payout odds by an odds processing unit, wherein each of the at least one variable odds set includes a plurality of variable odds, and each of the plurality of variable odds has a probability to be selected, and wherein in each of the at least one variable odds set, according to the probability to be selected, the odds processing unit selects one of the plurality of variable odds to replace the payout odds correspondingly to generate an adjusted payout odds set for the gambling game, and wherein the at least one variable odds set meets a plurality of requirements that numbers of the variable odds are more than two, and numerical values of parts of all the variable odds are lower than numerical values of the corresponding payout odds, and a variable value of the rate of RTP calculated according to the variable odds meets a specified condition;

an odds updating step, displaying the adjusted payout odds set on the display unit after completing the betting step; and the variable odds selecting step;

a game result generating step, selecting one of the plurality of game results according to the probability of occurrence by a game result generating unit in each round of the gambling game as a round result for each round of the gambling game; and a payout step, paying out according to the bet signal, the round result, and the adjusted payout odds set by a payout unit.

12. The method for providing variable odds as claimed in claim 11, wherein the specified condition is that the variable value of the rate of RTP is a minimum.

13. The method for providing variable odds as claimed in claim 11, wherein the input unit allows the player to selectively input an upper limit value, a lower limit value, or amount of the at least one variable odds, and allows the odds processing unit to generate the at least one variable odds set accordingly.

14. The method for providing variable odds as claimed in claim 13, wherein the odds processing unit generates the at least one variable odds set by a mathematical trial and error method.

15. The method for providing variable odds as claimed in claim 11, wherein further determining whether to perform the variable odds selecting step according to a preset condition.

16. A method for providing variable odds, which is provided for a player to play at least one round of a gambling game, the gambling game including a plurality of game results and a payout odds set, and a display unit displaying a game screen of the gambling game, the game screen including a plurality of betting areas corresponding to the plurality of game results, the payout odds set including a plurality of payout odds corresponding to the plurality of game results, and in each of the rounds of game each of the plurality of game results including a probability of occurrence, and a rate of Return to Player (RTP) of the gambling game calculated according to the probability of occurrence, the method of the gambling game including:

an odds selecting step, providing a plurality of odds tables from an odds processing unit for the player selecting and enabling one of the plurality of odds tables, each of the plurality of odds tables including the variable odds set corresponding to the payout odds, each of the variable odds sets including a plurality of variable odds, and each of the variable odds having a probability to be selected, and wherein each of the plurality of odds tables separately meeting a plurality of requirements that numerical values of parts of the variable odds in each of the variable odds sets of each of the odds tables are lower than numerical values of the corresponding payout odds, and a variable value of the rate of RTP calculated according to the variable odds meets a specified condition;

a betting step, generating a bet signal via an input unit through the player betting on the betting areas;

a variable odds selecting step, selecting one of the at least one variable odds in each of the variable odds sets of the enabled odds table according to the probability to be selected through the odds processing unit, and replacing the corresponding payout odds to generate an adjusted payout odds set for the gambling game;

an odds updating step, displaying the adjusted payout odds set in the betting area on the display unit after completing the betting step and the variable odds selecting step;

a game result generating step, selecting one of the plurality of game results according to the probability of occurrence by a game result generating unit in each round of the gambling game as a round result for each round of the gambling game; and a payout step, paying out according to the bet signal, the round result, and the adjusted payout odds set by a payout unit.

17. The method for providing variable odds as claimed in claim 16, wherein the specified condition is that the variable value of the rate of RTP is a minimum.

18. The method for providing variable odds as claimed in claim 16, wherein in the odds selecting step, the odds processing unit further provides a basic odds table, which lists the payout odds and is included in a range for the player choosing to enable.

19. A method for providing variable odds, which is provided for a player to play at least one round of a gambling game, the gambling game including a plurality of game results and a payout odds set, and a display unit displaying a game screen of the gambling game, the game screen including a plurality of betting areas corresponding to the plurality of game results, the payout odds set including a plurality of payout odds corresponding to the plurality of game results, and in each of the rounds of game each of the plurality of game results including a probability of occurrence, and a rate of Return to Player (RTP) of the gambling game calculated according to the probability of occurrence, the method of the gambling game including:

an odds selecting step, grouping the plurality of payout odds into at least one set according to numerical values thereof, wherein the at least one set includes a plurality of variable odds sets, one of the plurality of variable odds sets is selected and enabled by the player, each of the variable odds sets including a plurality of variable odds, and each of the variable odds having a probability to be selected, and wherein each of the variable odds sets separately meets a plurality of requirements that numerical values of parts of the variable odds of each of the variable odds sets are lower than the corresponding payout odds, and a variable value of the rate of RTP calculated according to the variable odds meets a specified condition;

a betting step, generating a bet signal via an input unit through the player betting on the betting areas;

a variable odds selecting step, selecting one of the variable odds according to the probability to be selected through the odds processing unit, after enabling the selected variable odds set, and replacing the at least one payout odds of a same set respectively to generate an adjusted payout odds set for the gambling game;

an odds updating step, displaying the adjusted payout odds set in the betting area on the display unit after completing the betting step; and the variable odds selecting step;

a game result generating step, selecting one of the plurality of game results according to the probability of occurrence by a game result generating unit in each round of the gambling game as a round result for each round of the gambling game; and a payout step, paying out according to the bet signal, the round result, and the adjusted payout odds set by a payout unit.

20. The method for providing variable odds as claimed in claim 19, wherein the specified condition is that the variable value of the rate of RTP is a minimum.

* * * * *